Patented Mar. 28, 1944

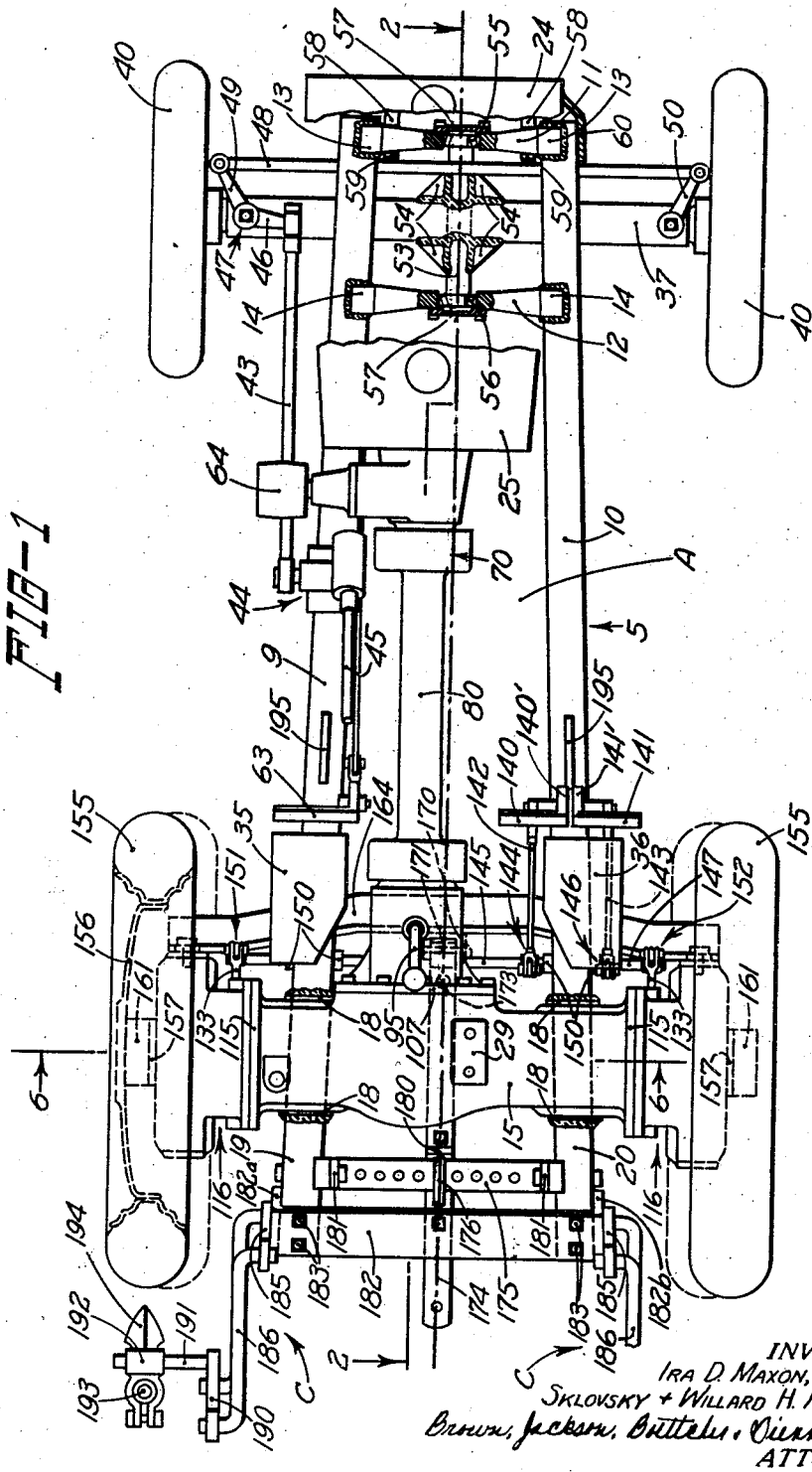

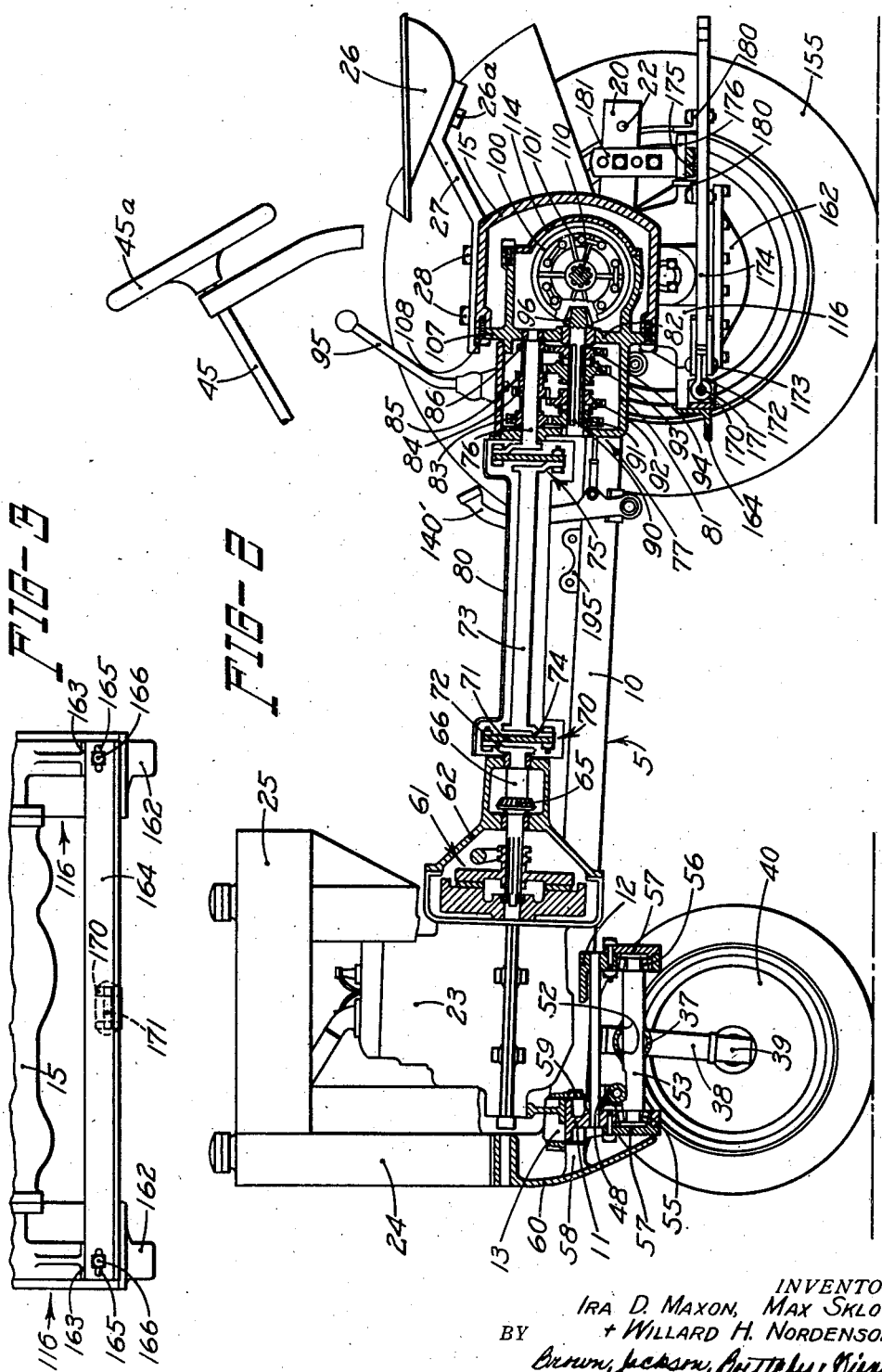

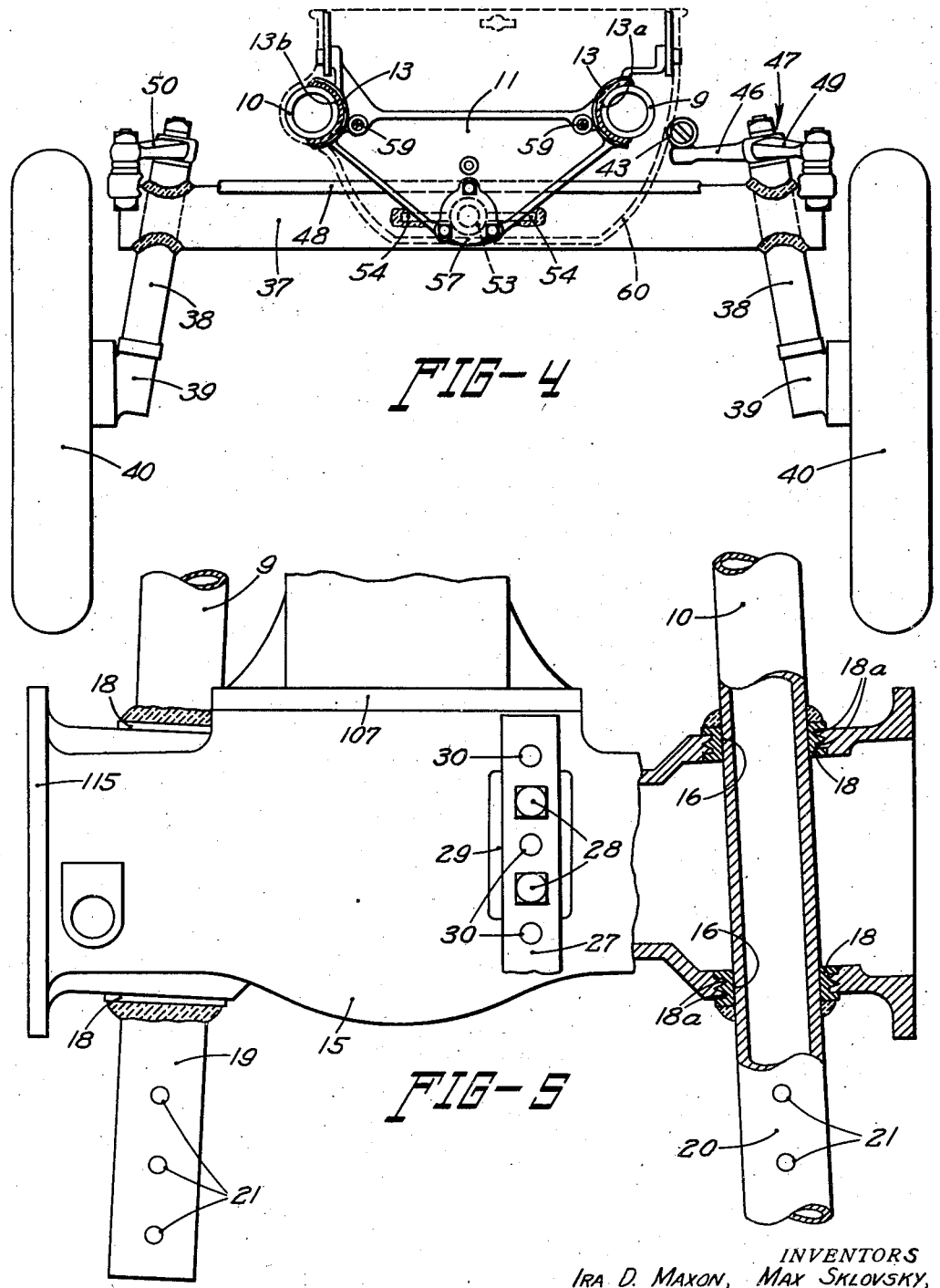

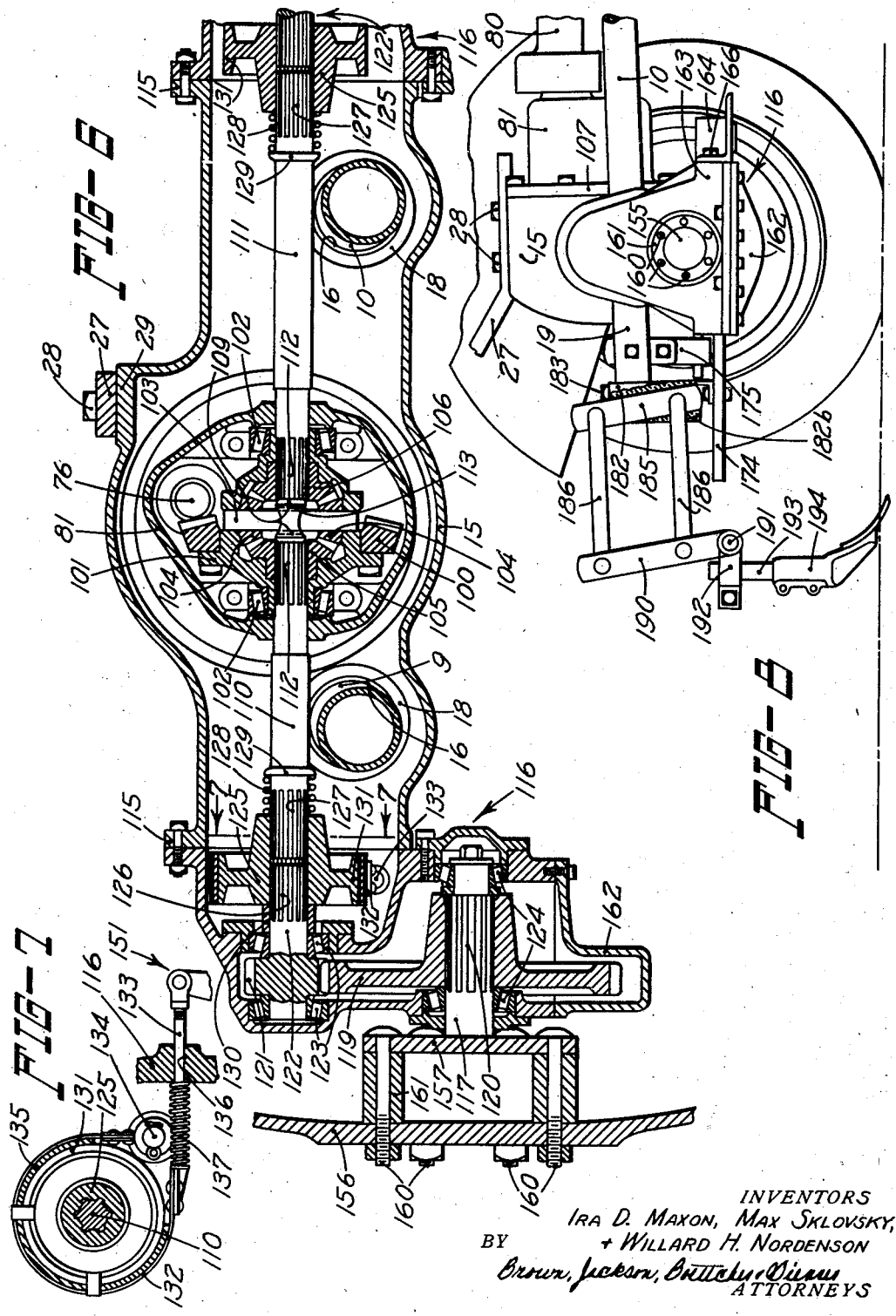

2,345,351

UNITED STATES PATENT OFFICE 2,345,351

TRACTOR

Ira D. Maxon, Max Sklovsky, and Willard H. Nordenson, Moline, Ill., assignors to Deere & Company, Moline, Ill., a corporation of Illinois Application November 5, 1937, Serial No. 172,906

40 Claims. (Cl. 180—1)

The present invention relates to farm tractors and the like, and is particularly concerned with the provision of a tractor that is built primarily to meet the requirements of the small general farmer and other users where a light and economical power unit is desired.

The principal object of the present invention is the provision of a tractor that is especially designed to handle practically all of the farm work that is ordinarily done with a team of horses, such as plowing, seed bed preparing, planting, and cultivating on small sized general farms.

More specifically, it is an object of the present invention to provide a tractor having improved frame construction, embodying transverse castings to which laterally spaced tubular longitudinal members are welded, and a further object in this connection is the provision of means making it possible to weld the rear ends of the tubular frame members to the rear axle housing, the latter being preferably of the banjo type and formed of cast iron. It is also an object of the present invention to extend the tubular frame members through suitable openings in the rear axle housing so as to provide convenient points of attachment for draft connections directly to the tubular frame members.

Another object of the present invention is the provision of an improved front axle construction in which, without loss of strength or sturdiness, the operator's vision of the plants being cultivated or the ground being traversed or worked is materially improved. Specifically, it is an object of the present invention to provide a front axle assembly made up of welded horizontal and vertical tubular parts, and attached to the tractor frame without braces, radius rods, or other parts that may interfere with the operator's view or which may damage plants in the operation of the machine. In this connection, it is a further object of the present invention to provide a front axle assembly in which the parts that come into engagement with the plants in the operation of the tractor are smooth and rounded, thereby preventing any injury to the plants in the row along which the tractor is driven. It is also an object of the present invention to provide a front apron or casting which not only masks the connections between the front axle assembly and the tractor frame but, in addition, is so formed that tall plants are guided so as to pass under the relatively high arched front axle without injury.

It is further an object of the present invention to improve the view of the operator by disposing the motor and associated drive shaft and other parts in offset relation on the tractor frame so as to afford the operator an excellent view of the immediate portions of the ground over which the tractor operates. Specifically, the power plant and propeller shaft are disposed toward the left side of the tractor, while the operator's station or seat is offset slightly toward the right, thereby making it possible to have a clear open space in the tractor frame down through which the operator may look to see the plants or portions of the ground over which the tractor is driven. A related object has to do with making it possible to view the crop row beneath the center of the tractor by providing a long transmission shaft between the engine and the rear drive mechanism, and covering the shaft with an enclosure which is so narrow that, with the shaft disposed in offset relation, the enclosure is entirely to one side of the center line. This permits an operator to see the plant row directly beneath the center of the tractor while seated in a normal sitting position in the operator's seat, which is offset in the opposite direction from the center line.

An additional object of the present invention is the provision of a tractor in which the transmission and differential units are mounted in the same housing, which housing is secured to and supported in an improved manner in the rear axle housing. It is also an object to provide a full floating rear axle construction in which the rear axle shafts are slidably connected, both with the differential unit of the rear axle and also with the driving connections to the traction wheels, whereby stresses due to any structural distortion of the tractor frame are not transmitted to either the differential gears or the other parts making up the driving train. A further object contemplates the use of the differential brake drums as a part of the full floating connection between the axle shafts and the traction wheel driving means.

Still further, another object resides in the provision of a drawbar construction especially adapted for association with rear axle constructions that embody depending final drive housings, whereby stresses imposed on the final drive housings by the connection of the drawbar thereto do not tend to twist or otherwise deform the final drive housings or impose objectionable stresses on the bearings that are supported in the final drive housings. Specifically, it is an object of the present invention to provide a transverse draft bar that is connected at its ends to lower portions of the final drive housings by a sliding connection, so that bending of the drawbar in operation will not tend to pull the lower portions of the final drive housings inwardly, as would be the case if the outer ends of the drawbar were attached rigidly to the lower portions of the depending final drive housings.

An additional object is the provision of improved control means for the tractor. According to the present invention, the clutch pedal that controls the transmission of power from the power plant is disposed at one side of the tractor, while at the other side thereof the two differential brake pedals are arranged so closely adjacent one another that they may, at the option of the operator, be operated simultaneously by the operator's foot, or either may be operated singly, as desired.

These and other objects and advantages of the present invention will be apparent to those skilled in the art after a consideration of the following detailed description of the preferred embodiment of the invention, taken in conjunction with the accompanying drawings illustrating such embodiment.

In the drawings:

Figure 1 is a plan view of a tractor embodying the principles of the present invention, certain parts being broken away in order to show better the construction with which the present invention is principally concerned;

Figure 2 is a partial sectional view taken along the line 2—2 of Figure 1;

Figure 3 is a fragmentary view, taken on the under side of the tractor and looking rearwardly at the drawbar frame, showing the slots through which the bolts are passed to connect the drawbar to the final drive housings of the tractor;

Figure 4 is an enlarged front view showing the front axle with the plant guiding apron casting removed;

Figure 5 is an enlarged plan view of the rear axle banjo housing, parts being broken away to show the manner of securing a welded connection between the tubular frame members and the cast iron banjo housing;

Figure 6 is a transverse vertical section taken through the rear axle housing assembly, generally along the line 6—6 of Figure 1;

Figure 7 is a fragmentary section taken along the line 7—7 of Figure 6; and

Figure 8 is a side view of the rear end of the tractor with a cultivator rig attached to the rear ends of the tubular frame members, the near traction wheel being removed in order to show the parts with more clarity.

Referring now more particularly to Figures 1 and 2, the frame of the tractor is indicated in its entirety by the reference numeral 5 and comprises two laterally spaced generally longitudinally extending tubular steel members 9 and 10 converging slightly toward their forward ends and connected at the front by a cast steel cross member 11 (Figures 1 and 4). The member 11 is substantially triangular in shape and has brackets 13 at the outer ends which are formed with openings or recesses 13a and 13b in which the forward ends of the frame members 9 and 10 are disposed and to which they are welded. A second cast steel cross member 12 is disposed rearwardly of the cross member 11, and is also provided with brackets 14 at its outer ends which are of practically the same formation as the brackets 13 described above and to which the forward portions of the frame members 9 and 10 are welded. These cross members or castings 11 and 12 serve as rigid parts of the frame 5 receiving the front axle assembly connections, as will be described below.

At the rear end of the frame 5 the tubular frame bars 9 and 10 extend through and beyond a cast iron axle housing 15 of the banjo type, which is best shown in Figure 5. Preferably, although not necessarily, the frame bars 9 and 10 extend through openings 16 formed in the front and rear wall sections of the rear axle housing generally below the center line thereof (Figure 6). Preferably, the tubular frame members 9 and 10 are formed of steel tubing, while the rear axle housing 15 is formed of cast iron. According to the present invention, to secure a rigid and reliable weld in fastening the frame bars 9 and 10 to the rear axle housing, steel collar inserts 18, which have the same inside diameter as the outside diameter of the tubular frame members 9 and 10, are cast in proper position in the rear axle housing at the same time that the latter is cast. The steel insert collars 18 have external grooves 18a designed to receive the molten iron during the casting operation so that when the casting of the axle housing is completed the steel inserts are rigidly and permanently interlocked with the casting. When, during the fabrication of the tractor frame 5, the tubular frame bars 9 and 10 are welded to the steel inserts or collars 18, such weld is strong and reliable and provides a permanently rigid frame for the tractor. By employing a steel casting for the axle housing 15 it is possible to eliminate the steel insert collars 18, but generally steel castings are much more expensive than cast iron parts, and hence, by the use of steel inserts it is possible to provide a steel welding surface for the axle housing at very little more expense than the cost of a cast iron housing.

Preferably the rear end portions of the tubular frame members 9 and 10 extend through the axle housing and rearwardly thereof, as at 19 and 20, so as to provide a novel means for attaching cultivator rigs and other implements or tools to the tractor. The end portions 19 and 20 are provided with a number of vertically and horizonally disposed holes 21 and 22 providing means for securing implement draft frames and the like to the rear end of the tractor.

A suitable power plant, such as a two cylinder gasoline motor 23, is carried on the forward end of the frame 5, and forward of the motor 23 the frame carries a radiator 24, and above the motor 23 is a fuel tank 25. At the rear of the tractor frame an operator's seat 26 is bolted, as at 26a in Figure 2, to a seat bar 27 which is bolted, as at 28, to a boss 29. The forward end of the seat bar 27 is provided with a number of openings 30 formed in the seat bar in properly spaced relation so as to provide for adjusting the seat 26 fore and aft so as to bring the operator to the proper position. Fixed to the tubular frame members 9 and 10 a short distance forwardly of the rear axle housing 15 are two foot-rest platforms 35 and 36, as best shown in Figure 1. From this figure it will be seen that the motor, the radiator, the fuel tank, and the propeller shaft, to be described later, are all offset slightly to the left of the center line of the tractor, while the operator's station or seat on the tractor is disposed slightly to the right. This particular construction materially improves the visibility from the operator's seat for steering the tractor while cultivating, it being seen from Figure 1 that there is an unobstructed area A (Figure 1) of substantial extent through which the operator can view the plants being cultivated or the ground being traversed. The operator is thus able to look past the propeller shaft enclosure and watch the action of the cultivating tools upon the row of plants beneath the center line of the tractor, while sitting in a normal sitting position without the necessity for leaning over or craning his neck.

The front wheel supporting structure is best shown in Figures 1, 2 and 4, and comprises a transversely disposed steel pipe member 37, the outer ends of which have generally vertically aligned apertures through which extend smaller tubular steel members 38 that are arranged generally vertically, as best shown in Figure 4. The vertical tubular members 38 are set at a slight angle to the perpendicular in order to provide the correct steering geometry for the tractor, and are welded to the front transverse tubular member 37 along their lines of intersection therewith at both the top and bottom, thereby providing an extremely rigid structure. The vertical members 38 extend downwardly for a considerable extent below the transverse tube 37 and receive the king-pins 39 that support the front wheels 40 on the tractor. A drag link 43 extends forwardly from a worm and sector mechanism 44 that is actuated by the steering shaft 45 to which a steering wheel 45a is fixed at its upper end. The forward end of the drag link 43, as best shown in Figure 1, is pivotally connected to the arm 46 of a bell crank lever 47 that is fixed to the upper end of the left wheel king pin 39. A tie rod 48 extends transversely of the tractor forward of and adjacent the upper edge of the front axle tube 37, and at one end the tie rod 48 is connected to the other arm 49 of the bell crank 47 while the other end of the tie rod 48 is pivoted to an arm 50 that is fixed to the upper end of the right wheel king-pin. From Figure 4 it will be particularly noted that the front end construction of the tractor constructed according to the principles of the present invention is especially adapted to pass over plants and the like and has no projecting parts, braces, radius rods, and the like, which would tend to catch the stalks. Instead, the use of pipe members provides smooth rounded surfaces under which the plants can pass without becoming entangled. The tie-rod 48 is disposed in an upper position with respect to the front axle tube 37 so that there is little danger of the part 48 catching stalks, plants and the like.

The tractor is supported on the front axle assembly substantially at the mid-point of the front axle tube 37. Substantially at its central portion the member 37 is provided with longitudinally aligned opening 52 in which a longitudinally extending tube 53 is disposed, the parts 37 and 53 being securely welded together along the lines of intersection. Triangular gusset plates 54 are welded between the two tubular members 37 and 53 so as to provide the required lateral rigidity. The longitudinal tubular member 53 is supported at its forward end in the central opening in the steel casting 11, and at its rear end the tubular member 53 is supported in the rear steel casting 12. Suitable bearing 55 and 56 are disposed in the central openings in the castings 11 and 12 and receive the tubular member 53 for rocking movement about a longitudinal axis. Preferably, the bearings 55 and 56 are of the pre-loaded type, these bearings being pre-loaded at the time of assembly by means of front and rear bearing caps 57 which have shoulders that bear against the outer races of the bearings, the inner races of which bear against shoulders provided in any suitable manner on the ends of the longitudinal member 53. Shims are placed under the bearing caps 57 so that when the bearing caps are tightened up against the transverse castings 11 and 12, the bearings will be placed under an initial thrust load so as to eliminate any slack while providing for free lateral rocking movement of the front axle assembly relative to the tractor. Fore and aft rigidity is, however, maintained without requiring any radius rods or other braces which would obscure the view of the crop rows from the tractor seat.

A bumper apron 60, preferably although not necessarily, made of cast iron, is bolted to the front end of the frame by cap screws 59 inserted through aligned apertures in the cross member 11 and in bosses 58 raised on the inner surface of the apron 60, and continues the line of the radiator down under the tractor, as best shown in Figure 2, thereby guiding the tops of tall plants down under the tractor without breaking the stalks or otherwise injuring them. It will be noted that the apron strikes the plants high on the stalks where they are most flexible, bending them gently downwardly so as to clear the front axle.

The drive from the motor comprises a clutch 61 that is carried in a clutch housing 62, and the clutch 61 is operated by means of a clutch pedal 63 that is mounted on the left hand frame member 9 immediately forward of the foot-rest platform 35. Immediately rearwardly of the clutch is a belt pulley take-off 64 that is driven by any suitable connection with a bevel gear 65 that is mounted on the shaft 66 that is driven when the clutch 61 is engaged. The rear end of the shaft 66 has a flexible coupling 70 that comprises a disk 71 of flexible material connected to the shaft 66 by means of three fingers 72 and to a propeller shaft 73 by three fingers 74 that are spaced angularly from the driving fingers 72. A second flexible coupling 75 is disposed at the rear end of the propeller shaft 73 and is substantially the same as the flexible coupling 70 just described. The coupling 75 operates the driving shaft 76 of the tractor transmission 77. A hood 80 extends the length of the propeller shaft 73, and at its ends covers the two flexible couplings 70 and 75. The hood 80 is sufficiently narrow, as is evident from the drawings, that in its offset position, is disposed entirely to the left of the center line of the tractor along its intermediate portion, and thus does not interfere with the operator's line of vision of the row of plants under the center of the tractor.

Both the transmission and the differential are carried in a single housing 81 which is divided by a wall 82 into a front transmission compartment and a rear differential compartment. The transmission of the tractor comprises the main shaft 76 mentioned above and on which four driving pinions 83, 84, 85 and 86 are fixedly mounted. In the lower portion of the transmission compartment, a splined driven shaft 90 is disposed parallel to the transmission shaft 76. Four driven gears 91, 92, 93 and 94 are carried on the driven shaft 90, the gears 92 and 93 being mounted for sliding movement, and are provided with clutch teeth that are adapted to engage similar clutch teeth formed on the gears 91 and 94 adjacent the front and rear portions of the transmission compartment. The gears 92 and 93 are provided with suitable grooves which receive suitable shifting forks controlled by a gear shift lever 95. The gears 91 and 94 are free to turn on the driven shaft 90, and the gear 91 runs in constant mesh with the companion driving pinion 83 on the driving shaft 76. The rear gear 94 is in constant mesh with its driving pinion 86 through a reverse idler gear (not shown). The gears 91 and 94 have companion clutch teeth with which the clutch teeth on the shiftable gears 92 and 93 are adapted to engage for the purpose of locking the selected gear to the shaft 90. Thus, the gear 92 may be moved into engagement with either the pinion 84 or the gear 91, and the gear 93 may be moved into engagement with either the pinion 85 or the gear 94. The driven transmission shaft 90 extends rearwardly through the dividing wall 82 and into the differential compartment. A bevel pinion 96 is fixed to the rear end of the transmission driven shaft 90.

The differential unit that is disposed within the differential compartment of the common housing 81 is generally of conventional design. A ring gear 100, with which the driving bevel pinion 96 meshes, is fixed in any suitable manner to a differential pinion frame 101 (Figure 6) which is supported by laterally spaced roller bearings 102 that are mounted in the side walls of the housing 81. A differential pinion shaft 103 is carried by the pinion frame 101 and receives two opposed differential pinions 104 which mesh with a pair of differential bevel gears 105 and 106 which are journaled for rotation in suitable recesses in the pinion frame 101. The differential bevel gears 105 and 106 are free to rotate relative to the differential pinion frame 101. The housing 81 carries a flange 107 (Figure 2) which is adapted to be secured, as by bolts 108, over the forwardly facing opening in the axle housing 15. When the combined transmission and differential case 81 is thus fastened in place, the differential unit is disposed entirely within the rear axle housing 15. One advantage of this particular construction is that the quantity of lubricant required for the differential is greatly reduced, since it is necessary only to have the required amount of lubricant in the differential compartment; it is not necessary to fill the entire banjo housing with lubricant up to the level required by the differential unit.

The power is transmitted from the differential unit to two full floating drive shafts 110 and 111 which extend into the differential section of the housing 81 and into and through the bevel gears 105 and 106 of the differential. The inner ends of the axle shafts 110 and 111 are splined, as at 112, and engage companion splines formed in the hubs of the differential gears 105 and 106. The differential pinion frame 101 also receives the inner ends of the full floating drive or axle shafts 110 and 111, permitting both sliding and rotative movement between the axle shafts and the pinion frame 101. A thrust block 113 bears against the inner ends of the axle shafts 110 and 111, and serves to maintain them in substantially fixed spaced relation at all times. The thrust block 113 is provided with a slot 109 through which the differential pinion shaft 103 passes, the slot 109 permitting axial floating movement of the axle shafts. A cover 114 closes the end of the differential compartment and acts to confine a lubricant used to the relatively small compartment, making it unnecessary to fill the entire banjo housing with lubricant, as mentioned above.

The outer ends of the axle housing 15 are provided with radially outwardly extending flanges 115 to which the final drive housings 116 are bolted. Each of the final drive housings 116 carries a wheel axle 117, a driving gear 119 that is fixed, as by splines 120, to the wheel axle 117, and a final drive pinion 121 which is integral with a pinion shaft 122. A pair of roller bearing units 123 supports the drive pinion shaft 122 in the final drive housing 116, and a second pair of bearing units 124 supports the wheel axle 117. The pinion shafts 122 at opposite sides of the tractor are connected with the associated axle shaft 110 and 111 by the differential brake drums 125, each brake drum including a hub which is splined and has a tight engagement with the splines 126 on the pinion shaft 122 associated therewith and a sliding engagement with splines 127 that are formed on the outer end of the associated axle shaft. Sufficient clearance is provided between the ends of the axle shafts and the associated pinion drive shafts 122 so that the rear axle shafts are full floating. The compression spring 128 bears against the inner end of the hub of each brake drum 125 and a shoulder 129 on the associated axle shaft, thereby imparting a force to the latter in the direction of the differential and holding the axle shaft against the thrust block 113 and the brake drum 125 against a spacer 130 between the inner race of the inner bearing 123 and the hub of the brake drum 125. Thus, both of the rear axles 110 and 111, together with the thrust block 113, are freely movable axially as a unit, and these parts are centered by the compression springs 128. By virtue of this construction, stresses due to structural distortion of the tractor frame are not transmitted to the differential gears or associated bearings.

Each of the brake drums 125 is provided with a rim section 131 serving as a brake drum proper, and surrounding each brake drum is a brake band 132 that is adapted to be contracted by the action of a brake rod 133 connected to the band at one end. The other end of the brake band is held against movement by an anchor pin 134 that is carried by the associated final drive housing 116. The brake band 132 is faced with a suitable lining 135, and the brake rod extends forwardly through an aperture 136 in the wall of the final drive housing 116. A compression spring 137 moves the brake band out of contact with the drum when pressure is removed therefrom, as best indicated in Figure 7.

The brakes are operated by means of two brake pedals 140 and 141 which are pivotally connected to the right hand frame member 10 immediately forward of the foot-rest platform 36. The pedal faces are disposed close together so that both may be operated at the same time by the operator's right foot engaging both of them, or they may be separately operated, as when it is desired to make a sharp turn, say at the end of a row when planting or cultivating, by the operator shifting his foot to the pedal desired. The pedal shanks 140', 141' extend downwardly flush with the inner adjacent ends of the pedal faces, in order that when one of the pedals is depressed, the operator's foot cannot catch under the other pedal. A tie rod 142 is pivoted at its forward end to the pedal 140 controlling the left brake, and the tie rod 142 extends rearwardly to a lever arm 144 on the right hand end of a transversely extending rock shaft 145. A second tie rod 143 is pivoted to the right hand brake pedal 141 and extends rearwardly and is pivoted to a lever arm 146 on a rock shaft 147. Both rock shafts are supported by the tubular frame members 9 and 10 through suitable hangers 150. At the left end of the rock shaft 145, a lever arm 151 connects with the brake rod 133 to actuate the left wheel brake. At the right end of the other rock shaft 147, a lever arm 152 connects with the brake rod 133 of the right wheel brake to actuate the latter.

The rear traction wheels are each indicated at 155, and each includes a wheel disc 156 that is held on the flange 157 of the wheel axle 117 by a plurality of bolts 160. The wheel tread of the tractor is made adjustable by means of spacers 161 disposed between the wheel disc 156 and the wheel receiving flange 157. By using spacers of various sizes, any suitable adjustment may be effected. However, the spacers 161 shown in Figure 6 are especially adapted for use with the rear wheels when it is desired to align the inside edges of the rear wheels with the inside edges of the front wheels. When the spacers 161 are removed and the wheel disc 156 clamped directly to the wheel receiving flange 157, the outside edges of the front and rear wheels are brought into alignment.

The driving connections in the final drive housings may be lubricated in any suitable manner. For example, the bottom of each of the final drive housings may be closed with oil pan 162, and the housings 116 filled to the desired points with suitable lubricant which will be carried up by the rotation of the drive gear 119 and lubricates the pinion 121 and the bearings 123 for the pinion drive shaft 122.

Preferably, although not necessarily, the tractor drawbar and associated parts receive draft from the tractor through suitable connections with the lower portions of the final drive housings. As best shown in Figure 8, a boss 163 having a vertical transverse face is formed on the lower front portion of each of the final drive housings 116, and bolted to the bosses 163 is a transversely extending draft tongue frame member 164 which is constructed of angle iron that is bowed slightly forward through the middle section for additional rigidity, and has laterally disposed slots 165 at its ends. Bolts 166 are passed through the slots 165 and screwed into threaded holes in the bosses 163, as best indicated in Figure 3. A U-shaped member 170 is welded to the back side of the member 164 at its midpoint, as best shown in Figure 2, and the arms of the member 170 are apertured to receive a transverse pivot bolt 171 that receives a strap 172 which is carried by a draft tongue 174 by means of a vertical pivot bolt 173. The strap 172 and the two pivot bolts 171 and 173 provide a universal shackle connection between the draft tongue 174 and the transverse draft member 164. The rear end of the draft tongue or drawbar 174 is supported on a U-shaped hanger 175, the drawbar 174 having a roller 176 carried between two brackets 180 that are bolted to the draft tongue and disposed on opposite sides fore and aft of the hanger 175. The upturned ends 181 of the hanger 175 are bolted to the rear portions 19 and 20 of the tubular frame members 9 and 10.

When an implement is drawn by the draft tongue 174, the bar 164 tends to bow in the direction of the applied force, which usually tends to draw the ends of the bar in toward the center. If the ends were rigidly connected to the final drive housings 116, the ends will tend to draw that portion of the housing inwardly toward the center and thereby throw the final drive gears and shafts out of alignment. However, by virtue of the above described slotted connection between the outer ends of the transverse bar 164 and the drive housings, the ends of the bar are free to slide endwise when deflected without forcing the drive housings out of their proper position.

The tractor shown in the drawings and described above is adapted to receive various forms of cultivating and other operating units. In Figures 1 and 8, a cultivator rig is shown as attached to the rear portion of the tractor frame. Each cultivator rig unit is indicated by the reference character C, and each unit is mounted on a transversely extending bar 182 that is disposed across the top of and carried by the rear ends of the tubular frame members 9 and 10 at the rear portions 19 and 20 thereof, as best shown in Figure 1. Two or more bolts 183 secure the bar 182 in place. The lateral ends of the bar 182 are extended downwardly on the outside of the frame bars 19 and 20, as indicated at 182a and 182b in Figure 1, and a member 185 is secured to the outside surface of each of these downwardly bent ends, each member 185 being inclined slightly to the rear, as best shown in Figure 8. The upper and lower end portions of each bar 185 are apertured to pivotally receive the forward ends of two rearwardly extending parallel rods 186, the rear ends of which are pivotally connected to a member 190 that is parallel to the associated member 185. A horizontal arm 191 extends laterally outwardly from the lower end of each of the members 190, and to each arm 191 a tool shank clamp 192 is fixed. Each clamp 192 receives a tool shank 193 and the attached cultivator shovel or other tool 194. By virtue of the parallel link mounting for each cultivator unit C, the cultivator tools 194 are constrained for generally vertical movement into various parallel positions.

One or more additional brackets 195 may be welded to the tubular frame members 9 and 10 to receive and support additional implements, the brackets 195 being shown in Figure 1 as mounted forwardly of the foot rest platforms 35 and 36.

While we have shown and described above the preferred structure in which the principles of the present invention have been embodied, it is to be understood that our invention is not to be limited to the specific details shown and described above, but that, in fact, widely different means may be employed in the practice of the broader aspects of our invention. For example, we have described a number of parts as being castings, and while we prefer to use castings it is to be understood that these parts may be formed in any suitable manner.

What we claim, therefore, and desire to secure by Letters Patent is:

1. In a tractor, a rear axle housing of cast metal, apertured metallic inserts disposed in the walls of said axle housing and cast therein with the latter, and tubular members carried in and extending through said apertured inserts and securely welded to the latter, the apertures of said inserts being of substantially the same internal diameter as the external diameter of said members, whereby a portion of the strain imposed upon said members will be transmitted directly to said inserts independently of the weld.

2. A tractor comprising a wheel supported frame including generally longitudinally disposed laterally spaced frame bars, a pair of longitudinally spaced transverse bars secured to said longitudinal bars adjacent their front ends, a front axle assembly including a transverse horizontally disposed tubular member having longitudinally spaced openings in the central portion thereof, a longitudinal tubular member disposed in and fixedly welded to said transverse tubular member at said openings, and bearing means at the ends of said longitudinally disposed tubular member carried by said longitudinally spaced transverse bars, whereby the front axle is connected with the tractor frame for lateral rocking movement.

3. A tractor comprising a frame including a pair of longitudinally disposed laterally spaced tubular frame bars and a pair of transversely disposed frame members having portions receiving the forward ends of said tubular frame bars and to which the latter are welded, longitudinally aligned bearing receiving means in the lower portions of said transverse frame members, a front axle assembly comprising a transverse tubular front axle member having openings extending therethrough in the central portion thereof, a longitudinally arranged tubular member disposed in said openings and securely welded to said tubular front axle member in rigid relation, and gusset plates welded to said longitudinal member and said tubular front axle member, and pre-loaded bearing units supported in said bearing receiving means and connecting said front axle assembly to the forward portion of the frame for lateral rocking movement about the axis defined by said bearing units.

4. A tractor comprising a rear axle housing, traction wheels journaled at the laterally outer portions thereof, a pair of longitudinally disposed tubular frame bars connected at their forward ends and extending rearwardly through openings in and welded to said rear axle housing, a power plant carried adjacent the forward ends of said tubular frame bars, and means for driving said traction wheels from said power plant including a pair of laterally extending drive shafts disposed within said rear axle housing above the portions of said tubular frame members that extend through said rear axle housing.

5. In a tractor, a front transverse member, a rear axle housing having openings extending therethrough, a pair of tubular frame members disposed longitudinally and extending rearwardly through said axle housing openings, said tubular frame members being welded to said front transverse member and to said rear axle housing, depending final drive housings fixed to the laterally outer ends of said rear axle housing, a transverse draft member carried by said final drive housings, a draw bar pivoted to said draft member and extending rearwardly therefrom, and a draw bar support comprising a U-shaped member having upwardly extending ends secured to the rearwardly extending ends of said tubular frame members.

6. A vehicle frame comprising a transversely disposed axle housing of cast metal having aligned openings in the front and rear sides thereof, metallic collars encircling said openings and rigidly cast in the walls of said housing, and a longitudinal frame member inserted through said collars and welded thereto to form a rigid frame, the internal diameter of said collars being substantially the same as the external diameter of said members, whereby some of the strain imposed upon said members will be transmitted directly to said collars independently of the weld.

7. A tractor comprising an engine, a transmission shaft, and gear mechanism connected together in fore and aft alignment, a rear axle disposed transversely and connected to said gear mechanism, a rear axle housing enclosing said axle and having a chamber for enclosing said gear mechanism, said chamber being offset toward one end of said housing, a supporting wheel at each end of said axle housing, and an operator's seat fixed to said rear axle housing and disposed in offset relation to said aligned gear mechanism, transmission shaft, and engine toward the other end of said axle housing, whereby a straight ahead view of the ground is obtained from the operator's station unobstructed by the transmission shaft.

8. The combination set forth in claim 7 with the further provision of a power take-off unit driven by said engine and extending laterally outwardly from the side of the tractor toward which the engine is mounted in lateral offset relation.

9. A tractor comprising a pair of longitudinally disposed laterally spaced frame bars, a pair of laterally spaced dirigible wheels disposed at the forward ends thereof for supporting the same, a pair of rear traction wheels behind said front wheels in alignment therewith, a transversely extending rear axle housing fixed to said bars adjacent the rear ends thereof and supported on said wheels, said housing including a gear chamber disposed in offset relation to said wheels and said frame, a transmission shaft extending forwardly from said gear chamber, an engine connected at the forward end of said shaft and supported on said frame in offset relation thereto, thereby providing an open space between said frame bars along one side of the frame, and an operator's seat fixed on said rear axle housing adjacent the rear end of said open space and offset laterally from said transmission shaft to enable the operator to obtain a clear view of the ground through said open space.

10. In a tractor having a pair of front steering wheels and a pair of rear drive wheels substantially in longitudinal alignment therewith, respectively, drive axles for said drive wheels, a differential mechanism for transmitting power to said drive axles and an engine disposed near the front of the tractor in offset relation to the fore and aft extending centerline between the front and rear wheels, a laterally extending housing enclosing said drive axles and having a differential chamber enclosing said differential mechanism and offset toward one end of said housing, a transmission shaft extending forwardly from said differential chamber substantially perpendicularly with respect to said drive axles and having a connection at its rear end with said differential mechanism and at its forward end with said engine, and an operator's seat mounted on said housing and offset thereon from the center of said differential chamber toward the opposite end of the housing, whereby a straight ahead view of the ground is afforded the operator unobstructed by the transmission shaft.

11. In a tractor, a frame comprising a transversely disposed axle housing having an opening in the forward side thereof, a longitudinally disposed frame member inserted through said opening and rigidly secured to said housing, an engine supported on said member near the forward end thereof and disposed in laterally offset relation to said tractor frame, and an operator's seat mounted on said axle housing in offset relation to said engine.

12. In a tractor, a frame comprising a transversely disposed axle housing having aligned openings in the front and rear sides thereof, a longitudinally disposed frame member inserted through said openings and rigidly secured to said housing, the rear end of said member extending beyond said housing and adapted to serve as supporting means for implement attachments, an engine and associated drive mechanism supported on said member and disposed in offset relation to said tractor frame at one side of the latter, and an operator's seat offset from said engine in the other direction and mounted on said axle housing.

13. In a tractor, the combination of a rigid frame having a pair of fore and aft spaced supports disposed near one end thereof, a fore and aft extending truck supporting member journaled in aligned bearings on said pair of supports for rotation about a longitudinally extending axis but restrained from other movement relative to the frame, and a transversely extending tubular axle member having aligned openings intermediate the ends thereof through which said truck supporting member extends, the latter being rigidly fixed to said axle member.

14. In a tractor, a rear axle housing, a pair of depending final drive housings mounted at opposite ends thereof, respectively, and a draft tongue supporting member extending between said depending housings and connected thereto by means providing for a limited amount of sliding movement when said supporting member is bent by a draft load applied intermediate the ends of the latter, whereby strain on said depending housings is minimized.

15. In a tractor, a rear axle housing, a pair of depending final drive housings mounted at opposite ends thereof, respectively, and a draft tongue supporting member extending between said depending housings and connected thereto by means including bolts attached to said housings, said supporting member having transversely extending slots for receiving said bolts, whereby when a draft load is applied to said supporting member intermediate the ends thereof causing the latter to bend, strain on the housings tending to force them inwardly toward each other will be minimized.

16. In a tractor having a transverse rear axle housing, drive wheels disposed at opposite ends thereof, respectively, and dirigible front wheels, the combination of a longitudinally extending engine mounted on the tractor, a transmission shaft extending rearwardly from the engine and connected with driving axles in said axle housing, said engine and shaft being offset toward one side of said tractor so that said shaft extends into said axle housing at a point closer to one end of the latter, a steering wheel supported on said tractor offset toward said one end of said axle housing and having a steering shaft extending forwardly therefrom to connect with said dirigible front wheels, and an operator's seat mounted on said rear axle housing but offset toward the opposite end of the latter to provide a view of the ground ahead of said seat, unobstructed by said steering wheel and transmission shaft.

17. A tractor comprising a front axle construction having spaced wheels, a rear axle structure having spaced wheels, said axles having the same longitudinal center line, a motor having a supporting structure rigidly connected to the rear axle structure, said motor being disposed laterally to one side of the center line of the axles, means pivotally connecting said supporting structure to the center of the front axle construction, and a driver's station at the rear of the tractor.

18. A tractor comprising a front axle construction having spaced wheels, a rear axle structure having spaced wheels, said axles having the same longitudinal center line, a motor having a supporting structure rigidly connected to the rear axle structure, said motor being disposed laterally to one side of the center line of the axles, means pivotally connecting said supporting structure to the front axle construction at a point offset with respect to the longitudinal center line of the motor, and a driver's station at the rear of the tractor.

19. A tractor comprising a front axle construction having spaced wheels, a rear axle structure having spaced wheels, said axles having the same longitudinal center line, a frame rigidly connected to the rear axle structure, a motor supported on said frame in a position laterally offset with respect to the center line of the frame, and means pivotally connecting the frame to the front axle construction on the center line of the axles and the frame, a driver's seat mounted on the rear axle structure in a position offset with respect to the center line of the frame on the side opposite the motor.

20. A tractor comprising a front axle construction having spaced wheels, a rear axle structure having spaced wheels, said axles having the same longitudinal center line, a motor having a supporting structure rigidly connected to the rear axle structure, said motor being disposed laterally to one side of the center line of the axles, means pivotally connecting said supporting structure to the front axle construction comprising longitudinally aligned bearings rigidly supported on the front axle construction providing for relative lateral tilting movement but preventing relative horizontal movement, and a driver's station at the rear of the tractor.

21. A tractor comprising a front axle construction having spaced wheels, a rear axle structure having spaced wheels, said axles having the same longitudinal center line, a motor having a supporting structure rigidly connected to the rear axle structure, said motor being disposed laterally to one side of the center line of the axles, means pivotally connecting said supporting structure to the front axle construction comprising spaced longitudinally aligned supporting means on said frame structure pivotally connected to companion supporting means fixed to said front axle construction providing for relative lateral tilting movement but restraining relative horizontal movement, and a driver's station at the rear of the tractor.

22. A tractor comprising a front axle construction having spaced wheels, a rear axle structure having spaced wheels, said axles having the same longitudinal center line, a motor having a supporting structure rigidly connected to the rear axle structure, said motor being offset laterally to one side of the center line of the axles, means pivotally connecting said supporting structure to the front axle construction on the center line of said axles, comprising spaced longitudinally aligned supporting means on said frame structure pivotally connected to companion supporting means fixed to said front axle construction, providing for relative lateral tilting movement but restraining relative horizontal movement, and a driver's station at the rear of the tractor.

23. A rear end construction for a vehicle, comprising a longitudinal rear body part including drive mechanism, a housing carried at one side of the body part and enclosing a first transverse axle disposed closely adjacent that side of the body part, a second housing carried at the other side of the body part and enclosing a second transverse axle, a rigid supporting part for said second housing, spacing the second axle a comparatively greater distance transversely at that side of the body part, wheels on the axles, differential drive means enclosed in the rear body part and interconnecting the axles and an operator's station disposed at that side of the body part toward the wheel on the second axle.

24. A rear end construction for a vehicle, comprising a longitudinal rear body part, a housing carried at one side of the body part and including brake means and a first transverse axle disposed closely adjacent that side of the body part, a drive housing carried at the other side of the body part and including brake means and a second transverse axle, a rigid supporting part for said second housing spacing the second axle a comparatively greater distance transversely of that side of the body part, wheels on the axles, an operator's station offset at that side of the body part toward the wheel on the second axle, and a brake operating means mounted at one side of the aforesaid supporting part and connected with the aforesaid brake means.

25. A rear end construction for a vehicle, comprising a longitudinal rear body part containing drive gearing, a final-drive housing carried at one side of said body part and containing drive gearing including an axle, a transverse extension housing carried on said body part and extending therefrom in at least one direction, a second final-drive housing carried at one end of said extension housing at a greater distance laterally of said body part than the first said final drive housing and containing drive gearing including an axle, wheels on the axles, drive means connecting the final-drive gearing with the drive gearing in the body part, and a driver's station including a seat mounted over the extension housing at one side of the rear body part and between said body and the second final drive housing.

26. A rear end construction for a vehicle, comprising a longitudinal rear body part including drive mechanism, a housing carried at one side of the body part and enclosing a first transverse axle disposed comparatively closely adjacent that side of the body part, a second housing carried at the other side of the body part and enclosing a second transverse axle, a rigid supporting part mounted on said body part and connected with at least one of said housings and spacing the second axle a comparatively greater distance transversely at that side of the body part, wheels on the axles, differential drive means enclosed in the rear body part and interconnecting the axles, and an operator's seat offset laterally of said body part, and a seat support mounted on said rigid supporting part between said body part and the wheel on the second axle.

27. A rear end construction for a vehicle, comprising a longitudinal rear body part, a housing carried at one side of the body part and including brake means and a first transverse axle disposed comparatively closely adjacent that side of the body part, a drive housing carried at the other side of the body part and including brake means and a second transverse axle, a rigid supporting part for said housings mounted on said body part and spacing the second axle a comparatively greater distance transversely of that side of the body part, wheels on the axles, an operator's seat offset laterally of said body part towards the wheel on said second axle and disposed above and rearwardly of said rigid supporting part, and a brake operating means mounted at one side of the aforesaid supporting part and connected with the aforesaid braking means.

28. A rear end construction for a vehicle, comprising a longitudinal rear body part containing drive gearing, a transverse body part connected to said longitudinal body part, a final drive housing mounted on one of said body parts at one side of said longitudinal body part and containing drive gearing including an axle, a second final drive housing carried at the outer end of said transverse body part on the opposite side of said longitudinal body part and containing drive gearing including an axle, wheels on said axles, drive means connecting the final drive gearing with the drive gearing in the longitudinal body part, and a driver's station including a seat offset to one side of said longitudinal body part over said extension housing, said seat being supported between the longitudinal body part and the second final drive housing.

29. A one row cultivating tractor comprising, in combination, means serving as a supporting frame, an engine carried at the forward end thereof, a transversely disposed front axle, on which said frame means is supported, said axle having wheels journaled at opposite ends thereof and arched upwardly to clear a row of plants under the center of the tractor, a transversely disposed rear axle housing including depending final drive housings at opposite ends thereof, drive wheels journaled on said final drive housings, respectively, below said axle housing, said rear axle housing including an intermediately disposed gear casing containing drive gear mechanism, a fore and aft extending transmission shaft connecting said engine and said gear mechanism, an enclosure for said shaft, said enclosure being appreciably narrower than said engine to provide a clear unobstructed space adjacent thereto, and an operator's seat having a seating surface between the plane of one of said rear wheels and a vertical plane through the axis of said shaft, said shaft enclosure being of such reduced width with respect to said engine and of such length that an operator occupying a normal sitting position on said seat, laterally offset with respect to said shaft towards said rear wheel, may observe a ground area of substantial length longitudinally of the tractor directly below said shaft enclosure.

30. A one row cultivating tractor comprising, in combination, means serving as a supporting frame, an engine carried at the forward end thereof, a transversely disposed front axle, on which said frame means is supported, said axle having wheels journaled at opposite ends thereof and arched upwardly to clear a row of plants under the center of the tractor, a transversely disposed rear axle housing including depending final drive housings at opposite ends thereof, drive wheels journaled on said final drive housings, respectively, below said axle housing, said rear axle housing including an intermediately disposed gear casing containing drive gear mechanism, a fore and aft extending transmission shaft connecting said engine and said gear mechanism, said shaft being offset in one direction from a vertical plane through the centers of said front and rear axles, an enclosure for said shaft, said enclosure being appreciably narrower than said engine to provide a clear unobstructed space adjacent thereto, and an operator's seat carried on said rear axle housing in laterally offset relation to said vertical plane in the opposite direction, to provide the operator with an unobstructed view past the shaft enclosure of the row of plants directly beneath the center of the tracor.

31. A row crop tractor comprising a transversely disposed front axle structure having spaced wheels adapted to straddle a row of plants, a transversely disposed rear axle structure having spaced wheels adapted to straddle the same plant row, said rear axle structure including an intermediately disposed gear casing containing drive gear mechanism, a power plant mounted at the front of the frame structure adjacent said front axle, shafting extending from said power plant to said drive gear mechanism, an enclosure for said shafting extending from said power plant to said gear casing, said enclosure being disposed entirely laterally to one side of the center line between the front and rear wheels, and an operator's station at the rear of the tractor including a seating surface on the side of said center line located opposite the enclosure and adjacent said rear axle structure so that an operator seated on said seating surface has an unobstructed line of vision along the side of said enclosure and ahead of said rear axle structure to view the approaching row being straddled by the tractor.

32. A row crop tractor comprising a transversely disposed front axle structure having spaced wheels adapted to straddle a row of plants, a transversely disposed rear axle structure having spaced wheels adapted to straddle the same plant row, said rear axle structure including an intermediately disposed gear casing containing drive gear mechanism, a power plant mounted at the front of the frame structure adjacent said front axle, shafting extending from said power plant to said drive gear mechanism, an enclosure for said shafting extending from said power plant to said gear casing, said enclosure and said power plant being offset laterally in one direction with respect to the center line between the front and rear wheels, and an operator's station adjacent said rear axle and including a seating surface offset laterally with respect to said enclosure in the opposite direction so that an operator seated on said seating surface has an unobstructed line of vision along the side of said enclosure and ahead of said rear axle structure to view the approaching row being straddled by the tractor.

33. A row crop tractor comprising a transversely disposed front axle structure having spaced wheels adapted to straddle a row of plants, a transversely disposed rear axle structure having spaced wheels adapted to straddle the same plant row, said rear axle structure including an intermediately disposed gear casing containing drive gear mechanism, a power plant mounted at the front of the frame structure adjacent said front axle, shafting extending from said power plant to said drive gear mechanism, an enclosure for said shafting extending from said power plant to said gear casing, said enclosure and said power plant being positioned laterally to one side of the center line between the front and rear wheels, said enclosure being positioned entirely to one side of such line, and an operator's seat mounted on said rear axle structure including a seating surface on the side of said center line opposite the enclosure and adjacent said rear axle structure so that an operator seated on said seating surface has an unobstructed line of vision along the side of said enclosure and ahead of said rear axle structure to view the approaching row being straddled by the tractor.

34. A row crop tractor comprising a transversely disposed front axle structure having spaced wheels adapted to straddle a row of plants, a transversely disposed rear axle structure having spaced wheels adapted to straddle the same plant row, said rear axle structure including an intermediately disposed gear casing containing drive gear mechanism, a power plant mounted at the front of the frame structure adjacent said front axle, shafting extending from said power plant to said drive gear mechanism, an enclosure for said shafting extending from said power plant to said gear casing, said enclosure being disposed entirely laterally to one side of the center line between the front and rear wheels, and an operator's station at the rear of the tractor including a seating surface on the side of said center line located opposite the enclosure and adjacent said rear axle structure, and a steering shaft at the side of said enclosure remote from said center line, so that an operator seated on said seating surface has an unobstructed line of vision along the side of said enclosure and ahead of said rear axle structure to view the approaching row being straddled by the tractor.

35. In a row crop tractor comprising a transversely disposed front axle structure having spaced wheels at opposite ends thereof adapted to straddle a row of plants, a transversely disposed rear axle housing having spaced wheels at opposite ends thereof adapted to straddle the same plant row, drive gear mechanism disposed within said rear axle housing, a motor having a longitudinally extending drive connection with said drive gear mechanism and having a supporting structure rigidly connected to said rear axle housing and adapted to carry ground-working tools adjacent its forward end, said longitudinal drive connection having an enclosure, said motor and said enclosure being offset laterally in one direction with respect to the center line of said axles, a driver's seat mounted over said rear axle housing and offset laterally in the other direction with respect to said motor and said enclosure, whereby the driver has an unobstructed line of vision along the side of said enclosure and ahead of said rear axle housing to view the approaching row being straddled by the tractor, and means pivotally connecting the front end of said supporting structure to said front axle structure on said center line whereby the movements transmitted to the forward end of said supporting structure by virtue of one or the other of said front wheels moving vertically in going over uneven ground will be the same and the adverse effect on the depth of operation of the tools on the tractor will be equalized.

36. In a row crop tractor comprising a transversely disposed front axle structure having spaced dirigible wheels at opposite ends thereof adapted to straddle a row of plants, a transversely disposed rear axle housing having spaced wheels at opposite ends thereof adapted to straddle the same plant row, drive gear mechanism disposed within said rear axle housing, a motor having a longitudinally extending drive connection with said drive gear mechanism and having a supporting structure rigidly connected to said rear axle housing, said longitudinal drive connection having a relatively narrow enclosure, substantially narrower than said motor, said motor and said enclosure being offset laterally in one direction with respect to the center line of said axles, said enclosure being disposed entirely to one side of said center line, a driver's station having a seating surface offset laterally in the opposite direction with respect to said motor and said enclosure, whereby the driver has an unobstructed line of vision along the side of said enclosure and ahead of said rear axle housing to view both sides of the approaching row being straddled by the tractor, means on said supporting structure for mounting ground-working tools to operate on both sides of the row being straddled, and means pivotally connecting the front end of said supporting structure to said front axle structure on said center line whereby the movements transmitted to the forward end of said supporting structure by virtue of one or the other of said front wheels moving vertically in going over uneven ground will be the same and the adverse effect on the depth of operation of the tools will be equalized.

37. A one row cultivating tractor comprising, in combination, means serving as a supporting frame, an engine carried at the forward end thereof, a transversely disposed front axle, on which said frame means is supported, said axle having wheels journaled at opposite ends thereof, said wheels supporting said axle in an elevated position to clear a row of plants under the center of the tractor, a transversely disposed rear axle housing including final drive axles at opposite ends thereof, drive wheels mounted on said final drive axles, respectively, and supporting said rear axle housing in an elevated position to clear the same row of plants, said rear axle housing including an intermediately disposed gear casing containing drive gear mechanism, a fore and aft extending transmission shaft connecting said engine and said gear mechanism, an enclosure for said shaft, said enclosure being appreciably narrower than said engine to provide a clear unobstructed space adjacent thereto, and an operator's seat having a seating surface between the plane of one of said rear wheels and a vertical plane through the axis of said shaft, said shaft enclosure being of such reduced width with respect to said engine and of such length than an operator occupying a normal sitting position on said seat, laterally offset with respect to said shaft towards said rear wheel, may observe a ground area of substantial length longitudinally of the tractor directly below said shaft enclosure.

38. A one row cultivating tractor comprising, in combination, means serving as a supporting frame, an engine carried at the forward end thereof, a transversely disposed front axle, on which said frame means is supported, said axle having wheels journaled at opposite ends thereof, said wheels supporting said axles in an elevated position to clear a row of plants under the center of the tractor, a transversely disposed rear axle housing including final drive axles at opposite ends thereof, drive wheels mounted on said final drive axles, respectively, and supporting said rear axle housing in an elevated position to clear the same plant row, said rear axle housing including an intermediately disposed gear casing containing drive gear mechanism, a fore and aft extending transmission shaft connecting said engine and said gear mechanism, said shaft being offset in one direction from a vertical plane through the centers of said front and rear axles, an enclosure for said shaft, said enclosure being appreciably narrower than said engine to provide a clear unobstructed space adjacent thereto, and an operator's seat carried on said rear axle housing in laterally offset relation to said vertical plane in the opposite direction, to provide the operator with an unobstructed view past the shaft enclosure of the row of plants beneath the tractor.

39. A one row cultivating tractor comprising, in combination, means serving as a supporting frame, an engine carried at the forward end thereof, a transversely disposed front axle, on which said frame means is supported, said axle having wheels journaled at opposite ends thereof, said wheels supporting said axles in an elevated position to clear a row of plants under the center of the tractor, a transversely disposed rear axle housing including final drive axles at opposite ends thereof, drive wheels journaled on said final drive axles, respectively, and supporting said rear axle housing in an elevated position to clear the same plant row, said rear axle housing including an intermediately disposed gear casing containing drive gear mechanism, a fore and aft extending transmission shaft connecting said engine and said gear mechanism, said shaft being offset in one direction from a vertical plane through the centers of said front and rear axles, an enclosure for said shaft, said enclosure being appreciably narrower than said engine to provide a clear unobstructed space adjacent thereto, and an operator's seat carried on said rear axle housing in laterally offset relation to said vertical plane in the opposite direction, the degrees of offset of said shaft and of said seat being sufficient in relation to the width of said enclosure to provide the operator with an unobstructed view past the shaft enclosure of both sides of the row of plants beneath the tractor adjacent said vertical plane.

40. A one row cultivating tractor comprising, in combination, means serving as a supporting frame, an engine carried at the forward end thereof, a transversely disposed front axle, on which said frame means is supported, said axle having wheels journaled at opposite ends thereof, said wheels supporting said axle in an elevated position to clear a row of plants under the center of the tractor, a transversely disposed rear axle housing including final drive axles at opposite ends thereof, drive wheels journaled on said final drive axles, respectively, and supporting said rear axle housing in an elevated position to clear the same row of plants, said rear axle housing including an intermediately disposed gear casing containing drive gear mechanism, a fore and aft extending transmission shaft connecting said engine and said gear mechanism, an enclosure for said shaft, said enclosure being offset laterally of the center line of said front and rear axles to provide a clear unobstructed space adjacent thereto, and an operator's seat having a seating surface between the plane of one of said rear wheels and a vertical plane through the axis of said shaft, said shaft enclosure being offset to such degree with respect to said center line and of such length that an operator occupying a normal sitting position on said seat, laterally offset with respect to said shaft towards said rear wheel, may observe a ground area of substantial length longitudinally of the tractor directly below said shaft enclosure.

IRA D. MAXON.
MAX SKLOVSKY.
WILLARD H. NORDENSON.